(12) United States Patent
Fukukawa

(10) Patent No.: US 11,842,117 B2
(45) Date of Patent: Dec. 12, 2023

(54) INFORMATION DISPLAY SYSTEM AND INFORMATION DISPLAY METHOD

(71) Applicant: NEC Corporation, Tokyo (JP)

(72) Inventor: Masatoshi Fukukawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/794,384

(22) PCT Filed: Jan. 31, 2020

(86) PCT No.: PCT/JP2020/003819
§ 371 (c)(1),
(2) Date: Jul. 21, 2022

(87) PCT Pub. No.: WO2021/152858
PCT Pub. Date: Aug. 5, 2021

(65) Prior Publication Data
US 2023/0048748 A1 Feb. 16, 2023

(51) Int. Cl.
*G06F 3/14* (2006.01)
*A62B 18/08* (2006.01)
*G02B 27/01* (2006.01)
*G06F 3/01* (2006.01)
*G06F 3/02* (2006.01)
*H04N 7/18* (2006.01)
*G06F 3/16* (2006.01)

(52) U.S. Cl.
CPC ............... *G06F 3/14* (2013.01); *A62B 18/08* (2013.01); *G02B 27/0172* (2013.01); *G06F 3/017* (2013.01); *G06F 3/02* (2013.01); *H04N 7/183* (2013.01); *G06F 3/167* (2013.01)

(58) Field of Classification Search
CPC ... G06F 3/14; G06F 3/017; G06F 3/02; G06F 3/167; G06F 3/147; G06F 3/01; G06F 3/16; A62B 18/08; G02B 27/0172; G02B 2027/0141; H04N 7/183
See application file for complete search history.

(56) References Cited

U.S. PATENT DOCUMENTS

| | | | | | |
|---|---|---|---|---|---|
| 4,786,966 | A | * | 11/1988 | Hanson | G02B 27/0172 398/131 |
| 6,456,261 | B1 | * | 9/2002 | Zhang | H04N 5/33 345/9 |
| 6,476,391 | B1 | | 11/2002 | Zhang | |

(Continued)

FOREIGN PATENT DOCUMENTS

| | | |
|---|---|---|
| EP | 3434334 A1 | 1/2019 |
| JP | H06-40917 U | 5/1994 |

(Continued)

OTHER PUBLICATIONS

International Search Report for PCT Application No. PCT/JP2020/003819, dated Mar. 24, 2020.

(Continued)

*Primary Examiner* — Grant Sitta
(74) *Attorney, Agent, or Firm* — Sughrue Mion, PLLC

(57) ABSTRACT

An information display system according to the present disclosure includes: display device provided in a mask, the display device being configured to display a screen viewed by a person wearing the mask; and display control unit for switching a displaying mode of the screen.

13 Claims, 13 Drawing Sheets

(56) References Cited

U.S. PATENT DOCUMENTS

| | | | |
|---|---|---|---|
| 7,038,639 B1 | 5/2006 | Olstad et al. | |
| 7,460,304 B1* | 12/2008 | Epstein | G02B 27/017 359/356 |
| 9,047,873 B2* | 6/2015 | Schuck | G10L 21/02 |
| 9,247,779 B1 | 2/2016 | Aloumanis et al. | |
| 9,508,248 B2* | 11/2016 | Nakfour | H04W 4/90 |
| 9,753,285 B2* | 9/2017 | Imoto | G06F 3/147 |
| 9,996,309 B2* | 6/2018 | Lee | H04W 4/70 |
| 10,417,497 B1* | 9/2019 | Cossman | G08B 7/066 |
| 10,426,980 B2* | 10/2019 | Dorneanu | A61B 5/0022 |
| 10,902,536 B2* | 1/2021 | Boss | G06Q 10/063112 |
| 11,346,938 B2* | 5/2022 | Fleming | G01S 13/825 |
| 11,402,638 B2* | 8/2022 | Jensen | G06F 3/011 |
| 2002/0196202 A1* | 12/2002 | Bastian | G09G 3/003 345/8 |
| 2003/0058544 A1* | 3/2003 | Bianco | G02B 27/0176 359/630 |
| 2007/0181129 A1* | 8/2007 | Mattinson | A62B 18/08 128/206.21 |
| 2013/0088413 A1* | 4/2013 | Raffle | G09G 3/003 359/630 |
| 2013/0112195 A1* | 5/2013 | Smith | G02B 27/017 128/202.13 |
| 2015/0273248 A1* | 10/2015 | Kuutti | A62B 9/006 128/201.12 |
| 2017/0123211 A1* | 5/2017 | Lavoie | G06F 3/0219 |
| 2019/0033594 A1* | 1/2019 | Patil | G02B 27/0176 |
| 2019/0118008 A1* | 4/2019 | Thompson | G02B 27/0176 |
| 2020/0124850 A1* | 4/2020 | Smith | G08B 19/00 |
| 2020/0151859 A1* | 5/2020 | Long, II | G06T 5/40 |
| 2020/0160057 A1* | 5/2020 | Roxas | A61B 1/00048 |
| 2021/0240275 A1* | 8/2021 | Browne | G06F 3/014 |

FOREIGN PATENT DOCUMENTS

| | | |
|---|---|---|
| JP | H08-54282 A | 2/1996 |
| JP | 2001-021366 A | 1/2001 |
| JP | 2005-067367 A | 3/2005 |
| JP | 2009-065593 A | 3/2008 |
| JP | 2013-210319 A | 10/2013 |
| JP | 2019-502332 A | 1/2019 |
| JP | 2019-036888 A | 3/2019 |

OTHER PUBLICATIONS

JP Office Action for JP Application No. 2021-574428, dated Oct. 17, 2023 with English Translation.

* cited by examiner

INFORMATION DISPLAY SYSTEM AND INFORMATION DISPLAY METHOD

This application is a National Stage Entry of PCT/JP2020/003819 filed on Jan. 31, 2020, the contents of all of which are incorporated herein by reference, in their entirety.

TECHNICAL FIELD

The present disclosure relates to an information display system and an information display method.

BACKGROUND ART

For example, Patent Literature 1 discloses an information display system that is disposed in front of the face of a member of a fire brigade and configured to form (i.e., show) information viewed by the member of the fire brigade.

CITATION LIST

Patent Literature

Patent Literature 1: Japanese Unexamined Patent Application Publication No. 2019-36888

SUMMARY OF INVENTION

Technical Problem

However, in the system disclosed in Patent Literature 1, the timing at which the screen (e.g., a window or an image) viewed by the person wearing the mask is displayed is not proposed at all.

In view of the above-described problem, an object of the present disclosure is to provide an information display system and an information display method capable of displaying a screen (i.e., a window or an image) viewed by a person wearing the mask at an appropriate timing.

Solution to Problem

An information display system according to a first aspect of the present disclosure includes: display means attached to a mask, the display means being configured to display a screen viewed by a person wearing the mask; and display control means for switching a displaying mode of the screen.

An information display method according to a second aspect of the present disclosure includes: a step of displaying a screen viewed by a person wearing a mask; and a step of switching a displaying mode of the screen.

Advantageous Effects of Invention

According to the present invention, it is possible to provide an information display system and an information display method capable of displaying a screen (i.e., a window or an image) viewed by a person wearing the mask at an appropriate timing.

EXAMPLE EMBODIMENT

First Example Embodiment

Figure 1:
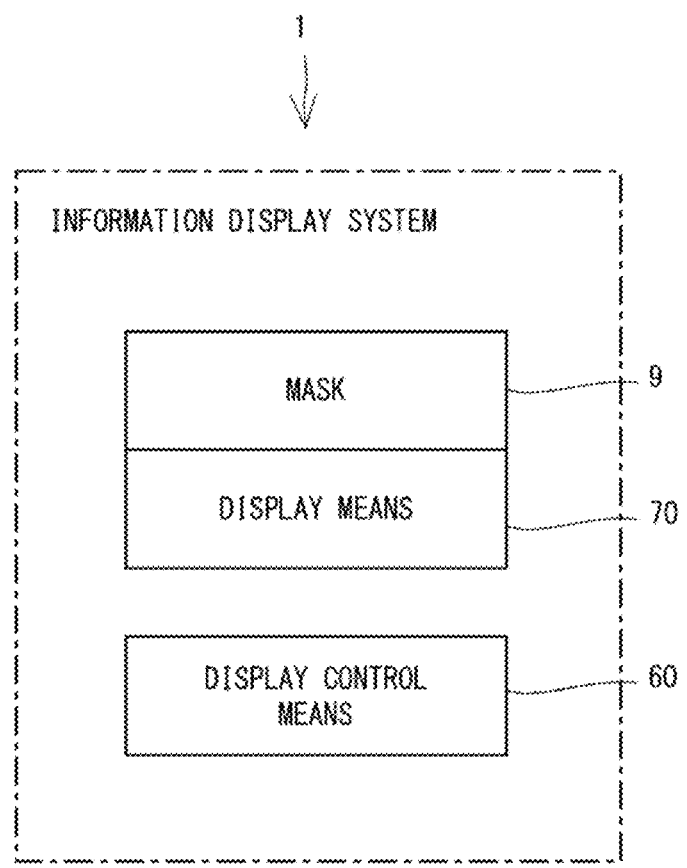
FIG. 1 is a schematic diagram of an information display system 1.

An information display system 1 according to a first example embodiment of the present invention will be described hereinafter with reference to the attached drawings. The same reference numerals (symbols) are assigned to corresponding components throughout the drawings, and redundant descriptions thereof are omitted.

Firstly, the configuration of the information display system 1 will be described with reference to FIG. 1.

FIG. 1 is a schematic diagram of the information display system 1.

As shown in FIG. 1, the information display system 1 includes display means 70 that is attached to a mask 9 and displays a screen (i.e., a window or an image) viewed by a person wearing the mask 9, and display control means 60 for switching the displaying mode of the screen.

According to the first example embodiment, it is possible to display a screen (i.e., a window or an image) viewed by a member of a fire brigade wearing the mask 9 at an appropriate timing. This is because the information display system 1 is equipped with the display control means 60 that switches the displaying mode of the screen.

Second Example Embodiment

As a second example embodiment of the present invention, the information display system 1 will be described hereinafter in a more detailed manner. An example in which the person wearing the mask 9 is a member of a fire brigade and the specific incident is sudden combustion (e.g., a flashover or a backdraft) that may occur in an environment in which the member of the fire brigade works (i.e., is working) will be described hereinafter.

Figure 2:
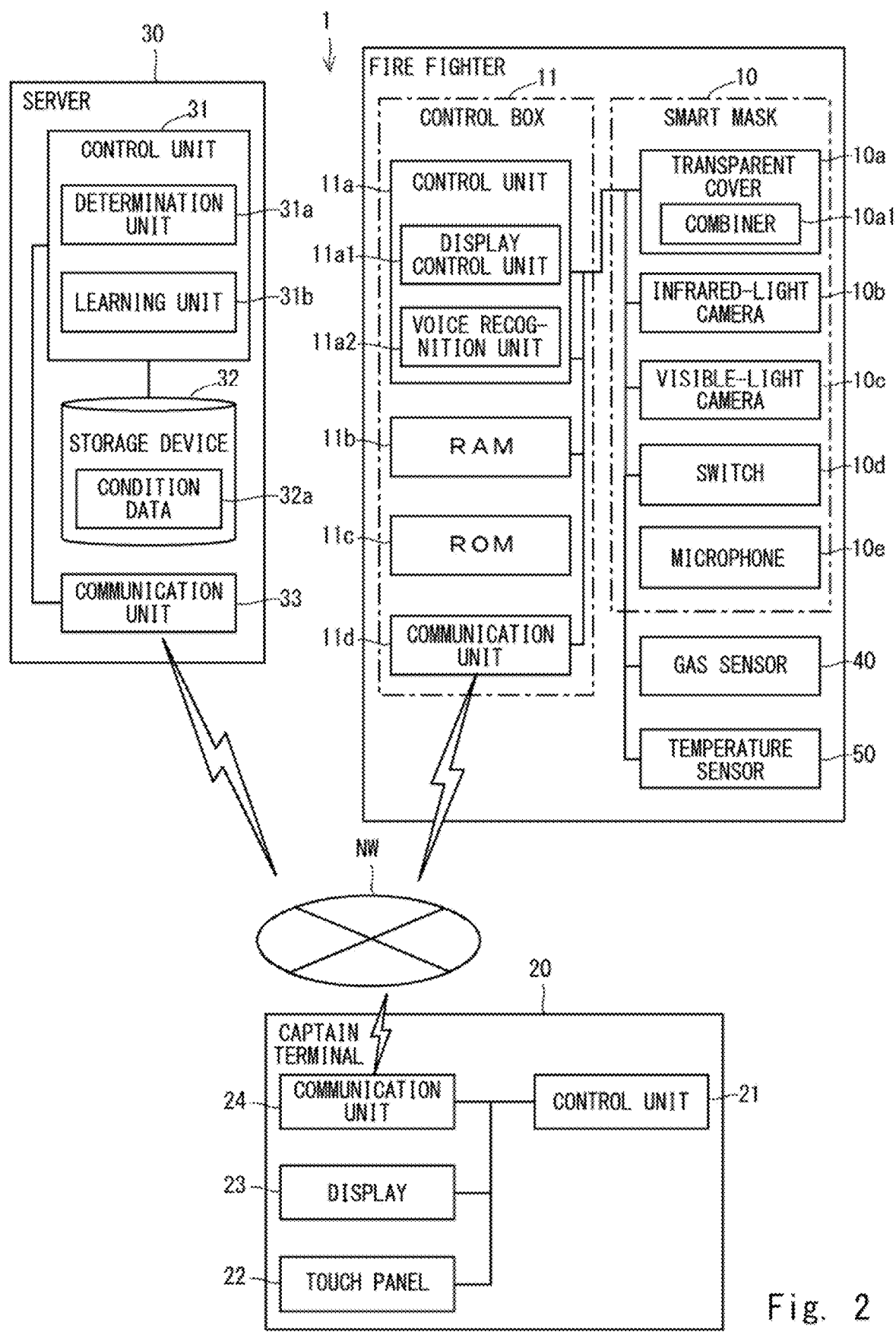
FIG. 2 is a detailed configuration diagram of the information display system 1.

FIG. 2 is a detailed configuration diagram of the information display system 1.

As shown in FIG. 2, in the second example embodiment, a transparent cover 10a (a combiner 10a1) is used as the display means 70, and a display control unit 11a1 is used as the display control means 60.

As shown in FIG. 2, the information display system 1 includes a smart mask 10, a control BOX 11, a gas sensor 40, a temperature sensor 50, a captain terminal 20, and a server 30.

Figure 3:
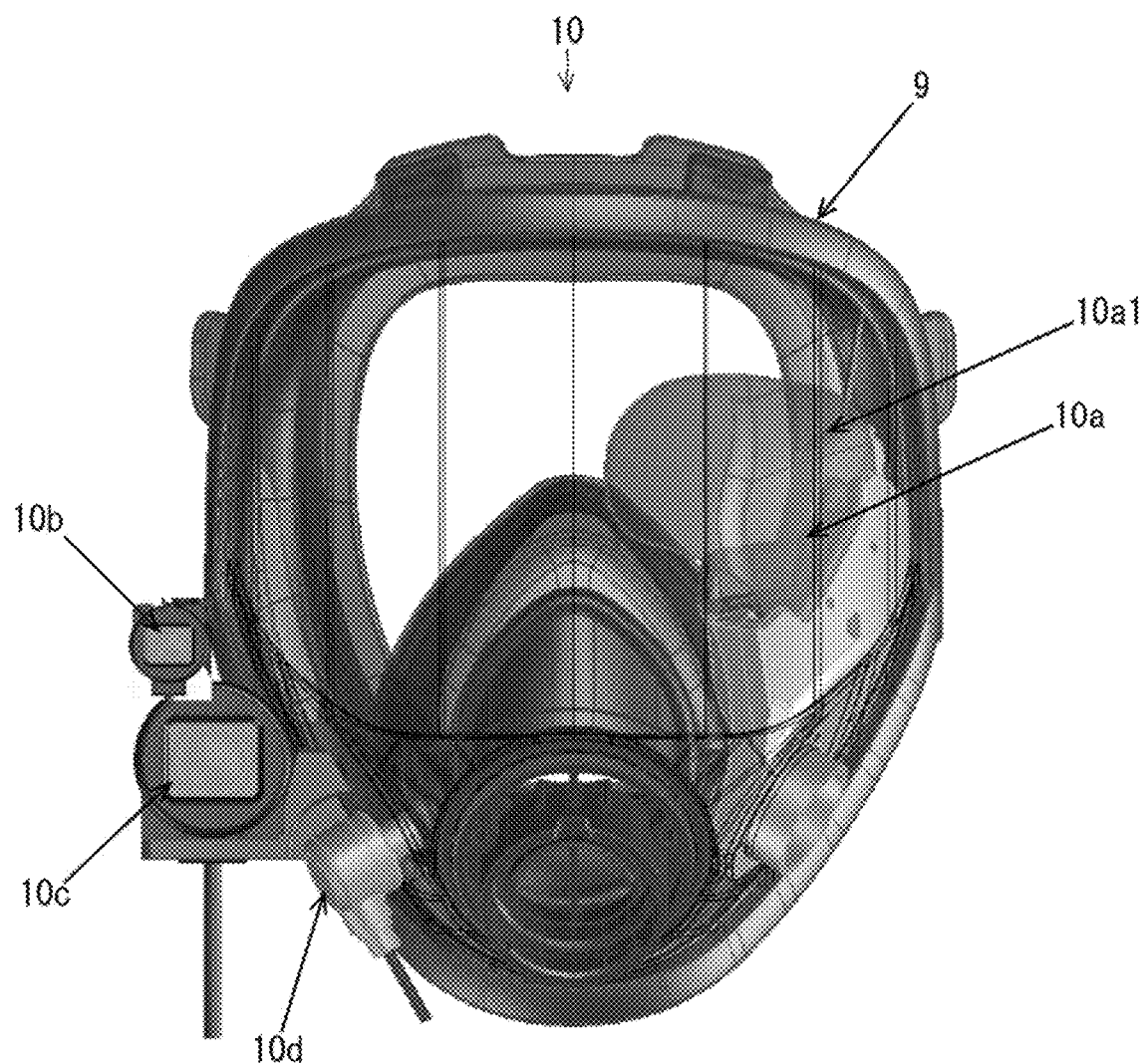
FIG. 3 shows an example of a smart mask 10 (a front view)

Firstly, the configuration of the smart mask 10 will be described. FIG. 3 shows an example of the smart mask 10 (a front view).

As shown in FIG. 3, the smart mask 10 includes the mask 9 that is worn by a member of a fire brigade who works at a fire site (an example of a person wearing a mask according to the present invention), a transparent cover 10a, an infrared-light camera 10b, a visible-light camera 10c, a switch 10d, and a microphone 10e (not shown in FIG. 3).

The transparent cover 10a, the infrared-light camera 10b, the visible-light camera 10c, the switch 10d, and the microphone 10e are attached to the mask 9.

The transparent cover 10a is disposed in front of the face of the member of the fire brigade in the state in which the mask 9 is worn by the member of the fire brigade. The transparent cover 10a includes a reflective optically-transparent member (e.g., a combiner 10a1). Various screens (e.g., a first screen DP1 and a second screen described later) generated by the control BOX 11 or the like are projected onto the combiner 10a1 by using a known optical system. These various projected images are reflected (and enlarged) by the combiner 10a1 and reach the eyes of the member of the fire brigade wearing the mask 9. As a result, the member of the fire brigade wearing the mask 9 views the various screens (e.g., the later-described first screen DP1 and the second screen) as virtual images that are enlarged and displayed as if they are floating in front of him/her (e.g., 1.5 m in front of him/her). Since the various screens (the virtual images) are overlapped with the field of view of the member of the fire brigade wearing the mask 9, the member of the fire brigade can view the various screens (the virtual images) without substantially moving his/her line of sight. Note that since a known optical system can be used as the optical system for projecting the various screens, the description thereof will be omitted. Further, the transparent cover 10a (the combiner 10a1), the control BOX 11 (e.g., the display control unit 11a1) that generates various screens projected onto the combiner 10a1, and the optical system that projects the generated various screens may be collectively referred to as a head-up display (or a head-mounted display).

That is, an apparatus or system capable of displaying a screen (e.g., a window or an image) viewed by a person wearing a mask can be referred to as a head-up display (or a head-mounted display).

Figure 4:
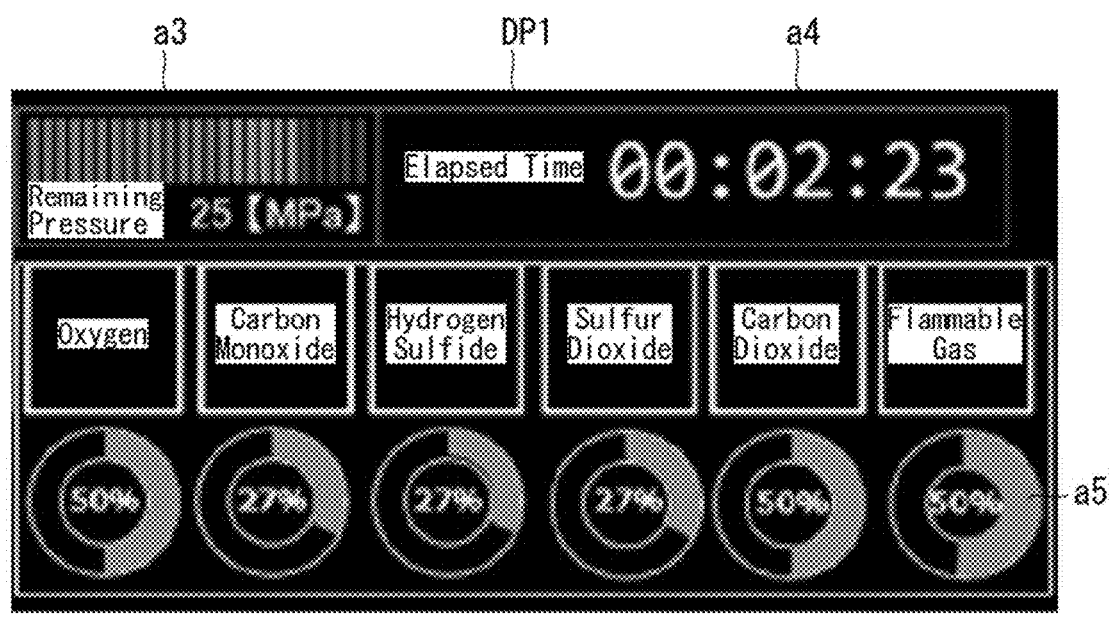
FIG. 4 shows an example of a first screen DP1 displayed as a virtual image for a member of a fire brigade wearing a mask 9.
Figure 5:
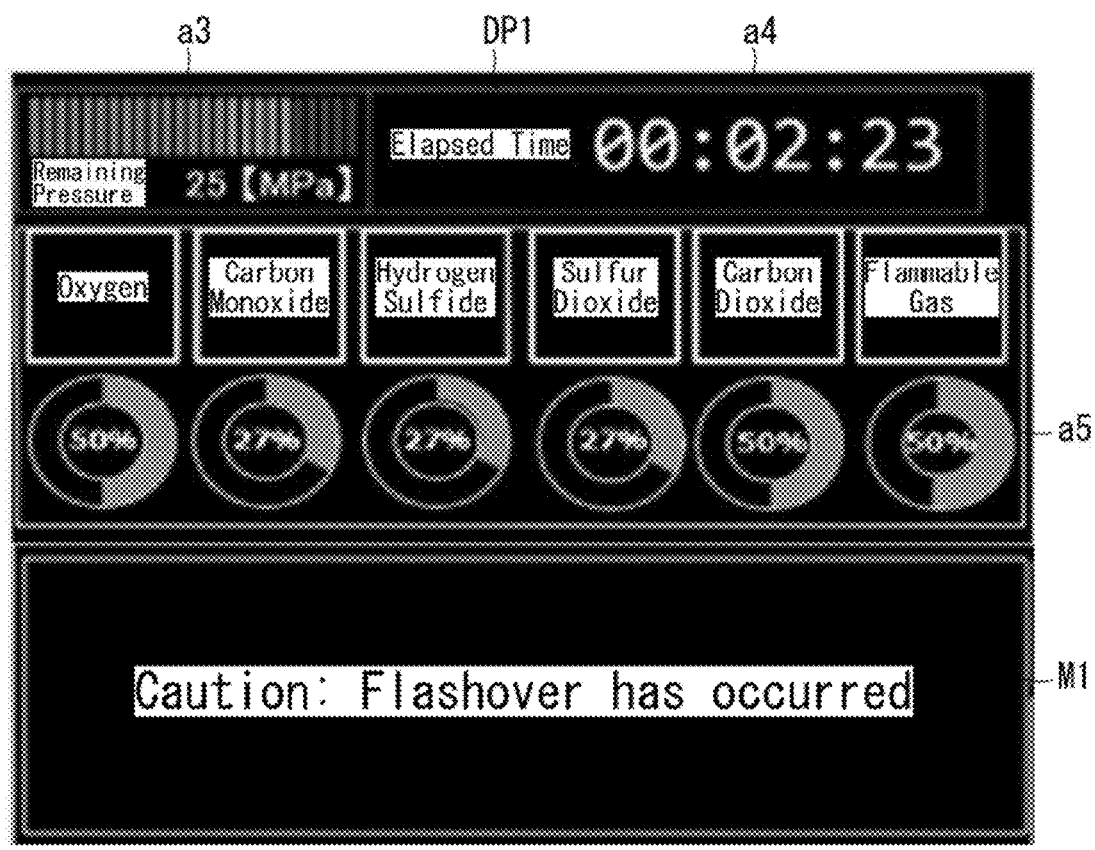
FIG. 5 shows an example of a first screen DP1 displayed as a virtual image for a member of a fire brigade wearing a mask 9.

FIGS. 4 and 5 show examples of the first screen DP1 displayed as a virtual image for the member of the fire brigade wearing the mask 9.

As shown in FIG. 4, the first screen DP1 includes an environmental information display area (including an air cylinder remaining amount (remaining pressure) display area a3, an entry elapsed time display area a4, a detection target gas concentration display area a5).

In the air cylinder remaining amount (remaining pressure) display area a3, the remaining amount (the remaining pressure) of an air cylinder equipped by the member of the fire brigade is displayed.

In the entry elapsed time display area a4, the time that has elapsed after the member of the fire brigade entered the fire site is displayed.

In the detection target gas concentration display area a5, the concentrations of various gases, which are the results of the detection by the gas sensor(s) 40, are displayed.

As shown in FIG. 5, there are case in which, in the first screen DP1, an urgent message M1, e.g., a message "Caution: Flashover has occurred" indicating that there is a possibility of an occurrence of sudden combustion in the environment in which the member of the fire brigade works or other messages is displayed. The sudden combustion that may occur in the environment in which a member(s) of a fire brigade works is, for example, a flashover or a backdraft.

Figure 6:
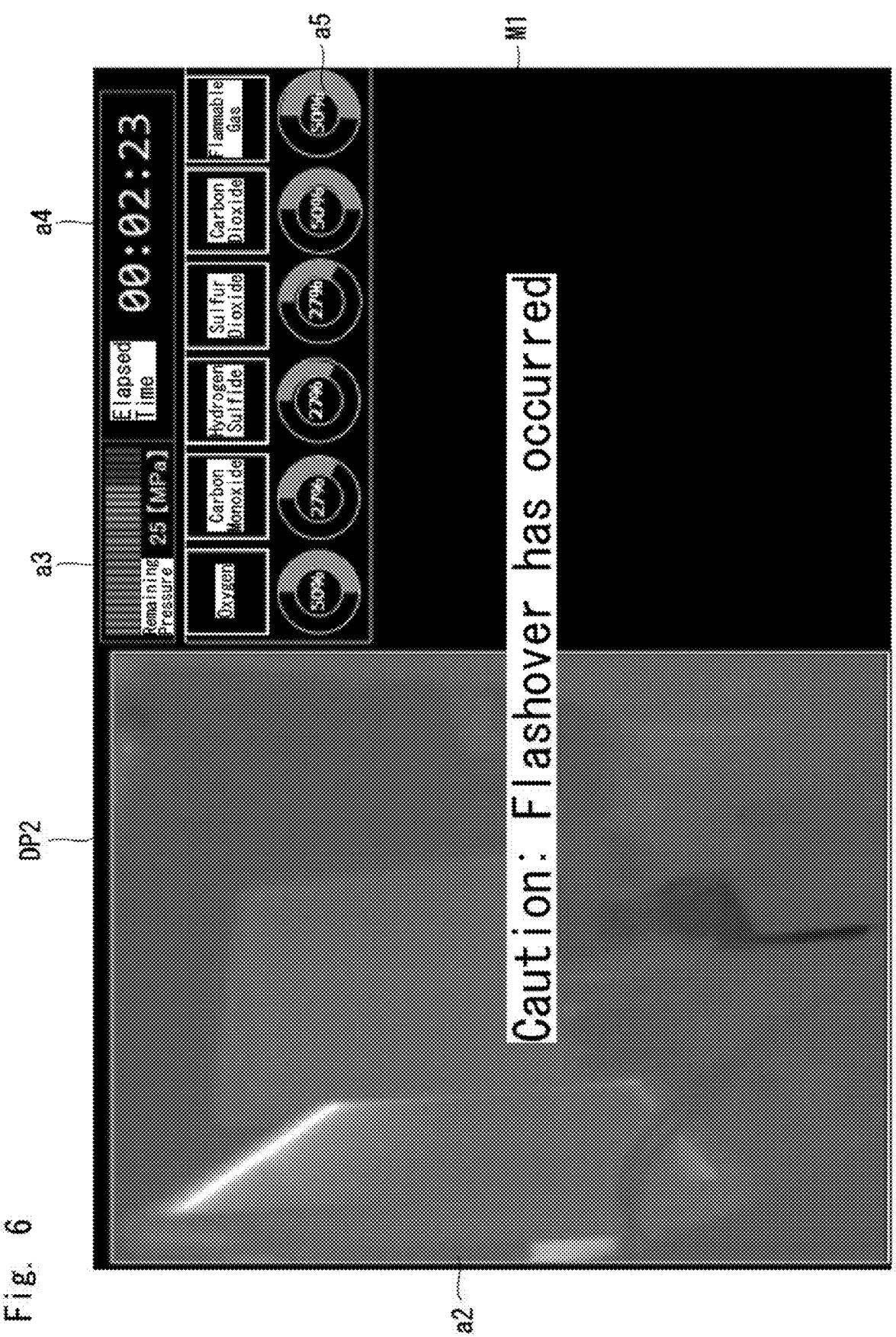
FIG. 6 shows an example of a second screen DP2 displayed as a virtual image for a member of a fire brigade wearing a mask 9.

FIG. 6 shows an example of the second screen DP2 displayed as a virtual image for the member of the fire brigade wearing the mask 9.

As shown in FIG. 6, the second screen DP2 includes a camera image display area a2 in addition to the environmental information display area (including the air cylinder remaining amount (remaining pressure) display area a3, the entry elapsed time display area a4, and the detection target gas concentration display area a5).

In the camera image display area a2, images (moving images or still images) taken by the infrared-light camera 10b or the visible-light camera 10c are displayed.

As shown in FIG. 6, there are case in which, in the second screen DP2, an urgent message M1, e.g., a message "Caution: Flashover has occurred" indicating that there is a possibility of an occurrence of sudden combustion in the environment in which the member of the fire brigade works or other messages is displayed.

The infrared-light camera 10b is an image-pickup apparatus that photographs (or films) the environment in which the member of the fire brigade works, and is used when, e.g., the environment in which the member of the fire brigade works is dark. The visible-light camera 10c is an image-pickup apparatus that photographs (or films) the environment in which the member of the fire brigade works, and is used when, e.g., the environment in which the member of the fire brigade works is bright.

The switch 10d is a switch operated by the member of the fire brigade, and is, for example, a push-button switch. The switch 10d is used to switch the displaying mode of the screen viewed by the member of the fire brigade wearing the mask 9.

The microphone 10e is a microphone for inputting (i.e., receiving) voices uttered by the member of the fire brigade. The microphone 10e is used to input (i.e., receive) voices which will be subjected to speech recognition.

The gas sensor(s) 40 and the temperature sensor 50 are attached to the outfit (e.g., a fire suit) worn by the member of the fire brigade.

The gas sensor(s) 40 detects the concentration(s) of a gas(es) in the environment in which the member of the fire brigade works. The gas sensor 40 is, for example, an oxygen sensor for detecting the concentration of oxygen, a carbon monoxide sensor for detecting the concentration of carbon monoxide, a hydrogen sulfide sensor for detecting the concentration of hydrogen sulfide, a sulfur dioxide sensor for detecting the concentration of sulfur dioxide, and/or a flammable gas sensor for detecting the concentration of a flammable gas(es).

The temperature sensor 50 detects the temperature in the environment in which the member of the fire brigade works.

The infrared-light camera 10b, the visible-light camera 10c, the gas sensor 40, and the temperature sensor 50 are examples of the sensor(s) according to the present invention.

Next, the configuration of the control BOX 11 will be described.

As shown in FIG. 2, the control BOX 11 includes a control unit 11a, a RAM (Random Access Memory) 11b, a ROM (Read Only Memory) 11c, and a communication unit 11d.

The control unit 11a includes a processor (not shown). The processor is, for example, a CPU (Central Processing Unit). The control unit 11a may include only one processor or may include a plurality of processors. The processor functions as a display control unit 11a1 and a voice recognition unit 11a2 by executing a certain program loaded from a nonvolatile memory such as the ROM 11c into the RAM 11b (not shown). At least one of these components may be implemented by hardware.

The display control unit 11a1 displays (forms, e.g., shows) images projected onto the combiner 10a1 and displayed as virtual images, e.g., displays the first screen DP1 (see FIGS. 4 and 5) and the second screen DP2 (see FIG. 6).

The voice recognition unit 11a2 recognizes voices uttered by the member of the fire brigade input through the microphone 10e.

The communication unit 11d is a communication apparatus that wirelessly communicates with the captain terminal 20 and the server 30 through a communication line NW (e.g., the Internet).

Next, the configuration of the captain terminal 20 will be described.

The captain terminal 20 is, for example, a tablet-type information process terminal, and as shown in FIG. 2, includes a control unit 21, a touch panel 22, a display 23, and a communication unit 24.

The control unit 21 includes a processor (not shown). The processor is, for example, a CPU. The control unit 21 may include only one processor or may include a plurality of processors. The processor controls the display 23 and the like by executing a certain program loaded from a nonvolatile memory such as a ROM (not shown) into a RAM (not shown).

The touch panel 22 is an input device operated by the leader of the fire brigade, and is disposed so as to cover the display surface of the display 23. The display 23 is, for example, a display equipped with the touch panel 22. A display equipped with a touch panel is also referred to as a touch screen display.

Figure 7:
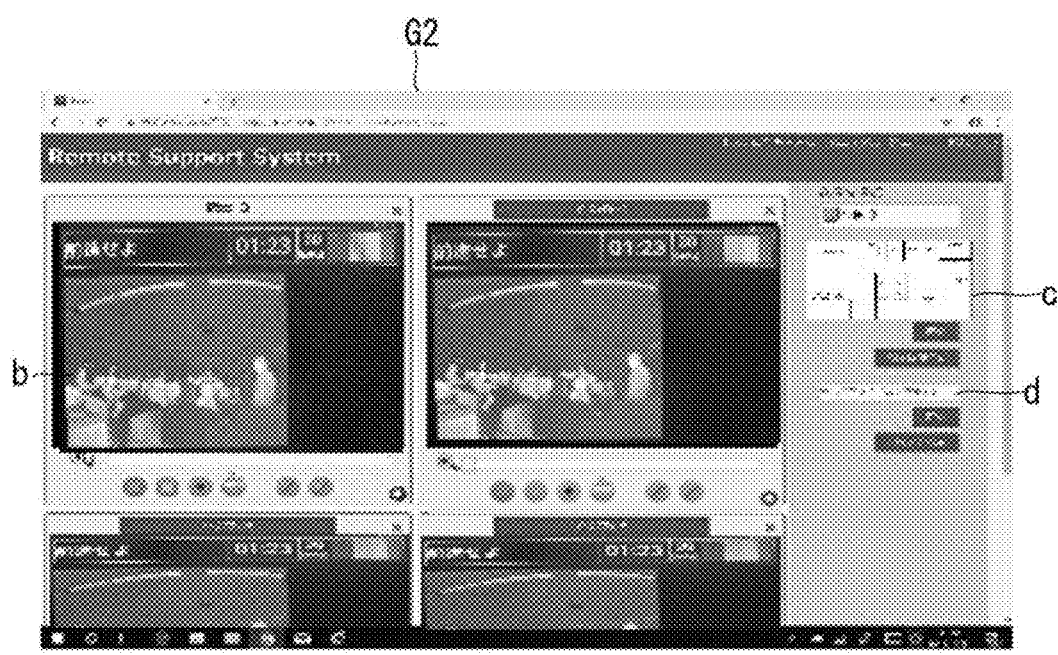
FIG. 7 shows an example of a screen G2 displayed on a display 23 of a captain terminal 20.

FIG. 7 shows an example of a screen G2 (e.g., a window G2) displayed on the display 23 of the captain terminal 20.

As shown in FIG. 7, the screen G2 includes a camera image display area b, a drawing and photograph information display area c, and a message transmission area d.

In the camera image display area b, the same images (the same moving images or the same still images) as those viewed by the member of the fire brigade wearing the mask 9 are displayed. Further, the whole information (such as a name and a blood type) of the member of the fire brigade (one or a plurality of members of the fire brigade) is displayed on the display 23. Further, it is possible to select an arbitrary member of the fire brigade and record a video image thereof through the touch panel 22 (in order to reflect on the situation later) (and is also possible to zoom in or out).

In the drawing and photograph information display area c, for example, drawings and photograph information of a disaster site are displayed.

In the message transmission area d, for example, a message (e.g., an urgent message M1 or M2 described later) to be transmitted to a member of the fire brigade is displayed. Further, it is possible to transmit a message through the touch panel 22.

As described above, in the captain terminal 20, it is possible to recognize and manage information about the work performed by a member(s) of the fire brigade from a remote place.

The communication unit 24 is a communication apparatus that wirelessly communicates with the control BOX 11 and the server 30 through the communication line NW (e.g., the Internet).

Next, the configuration of the server 30 will be described.

The server 30 is installed at a place remote from the fire site. As shown in FIG. 2, the server 30 includes a control unit 31, a storage device 32, and a communication unit 33.

The control unit 31 includes a processor (not shown). The processor is, for example, a CPU. The control unit 31 may include only one processor or may include a plurality of processors. The processor functions as a determination unit 31a and a learning unit 31b by executing a certain program loaded from a nonvolatile memory such as a ROM (not shown) into a RAM (not shown).

The determination unit 31a determines (predicts) a possibility of an occurrence of sudden combustion in the environment in which the member of the fire brigade works based on the results of the detection by the various sensors, received from the control BOX 11 and the condition data 32a stored in the storage device 32.

The learning unit 31b learns conditions under which sudden combustion occurs based on the detection results of the various sensors, received from the control BOX 11. In some cases, the learning unit 31b learns conditions under which sudden combustion occurs based on past cases or the like in which sudden combustion occurred.

In the storage device 32, the condition data 32a representing conditions (one condition or a plurality of conditions) under which sudden combustion occurs. The conditions under which sudden combustion occurs are, for example, a numerical value(s) or a numerical value range(s) representing the concentration(s) of a gas(es) at which sudden combustion occurs. This numerical value or the numerical value range may be calculated, for example, based on experiments or past cases.

Further, the conditions under which sudden combustion occurs are, for example, data representing characteristics of flames shown in images (e.g., moving images) taken by the image-pickup apparatus. The data representing the characteristics of flames are, for example, data representing the movements, colors, sizes, and/or the like of the flames. The data representing the characteristics of flames can be calculated, for example, by performing image processing on images taken in experiments or past cases.

The communication unit 33 is a communication apparatus that wirelessly communicates with the control BOX 11 and the captain terminal 20 through the communication line NW (e.g., the Internet).

Next, as an example of operations performed by the information display system 1 having the above-described configuration, a display switching process 1 through which the member of the fire brigade switches the displaying mode of a screen (i.e., a window or an image) by operating the switch 10d when he/she enters a fire cite will be described.

Figure 8:
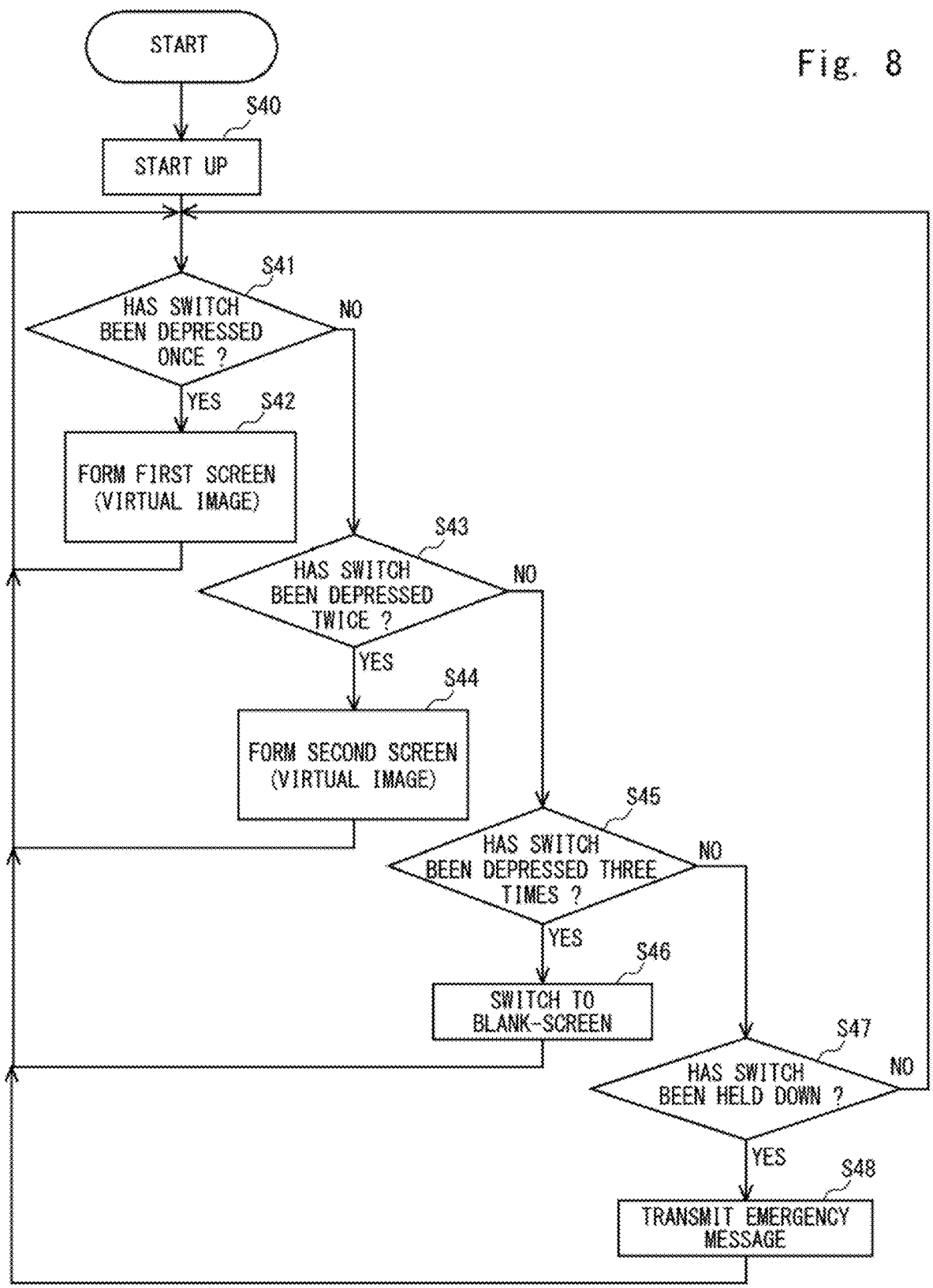
FIG. 8 is a flowchart of operations (a display switching process 1) performed by the information display system 1.

FIG. 8 is a flowchart of operations (the display switching process 1) performed by the information display system 1. The process shown in FIG. 8 is mainly implemented by having the control unit 11a (the processor) of the control BOX 11 execute a predetermined program loaded from a nonvolatile memory such as the ROM 11c into the RAM 11b. In the following description, it is assumed that various sensors detect (i.e., obtain) environmental information of the environment in which the member of the fire brigade works.

Firstly, the control BOX 11 is started up (Step S40). At this point, nothing is projected onto the combiner 10a1.

Next, the control unit 11a determines whether or not the button of the switch 10d is depressed once (Step S41).

When it is determined that the button of the switch 10d is depressed once (Step S41: Yes), the display control unit 11a1 forms (i.e., shows) a first screen DP1 (a virtual image) in which an environmental information display area (including the air cylinder remaining amount (remaining pressure) display area a3, the entry elapsed time display area a4, and the detection target gas concentration display area a5) is arranged in a display arrangement shown in FIG. 4 (Step S42).

Alternatively, when it is determined that the button of the switch 10d is depressed twice (Step S41: No, Step S43: Yes), the display control unit 11a1 forms a second screen DP2 (a virtual image) in which an image display area a2 is also disposed, in addition to the environmental information display area (including the air cylinder remaining amount (remaining pressure) display area a3, the entry elapsed time display area a4, and the detection target gas concentration display area a5), in a display arrangement shown in FIG. 6 (Step S44).

Alternatively, when it is determined that the button of the switch 10d has been depressed three times (Step S41: No, Step S43: No, Step S45: Yes), the display control unit 11a1 switches the screen to a blank-screen containing no information (i.e., no information is displayed in the screen) (Step S46). Note that the blank-screen may contain no information at all, or may contain information to such extent that the member of the fire brigade does not feel it as a nuisance.

Alternatively, when it is determined that the button of the switch 10d is held down (i.e., is kept pressed down for a while) (Step S41: No, Step S43: No, Step S45: No, Step S47: Yes), the control BOX 11 (communication unit 11d) transmits an emergency message to the captain terminal 20 or the like (Step S48). The emergency message is, for example, a message for reporting an abnormality of the member of the fire brigade.

After that, the processes in the steps S41 to S48 are repeatedly performed.

Note that the number of times of depressing of the button of the switch 10d determined in each of the steps S41, S43 and S45 is not limited to the aforementioned number. That is, the number of times of depressing of the button of the switch 10d determined in each of the steps S41, S43 and S45 may be any number as long as they are different from each other.

Next, as an example of operations performed by the information display system 1 having the above-described configuration, a display switching process 2 through which the member of the fire brigade switches the displaying mode of a screen (i.e., a window or an image) by uttering a voice will be described.

Figure 9:
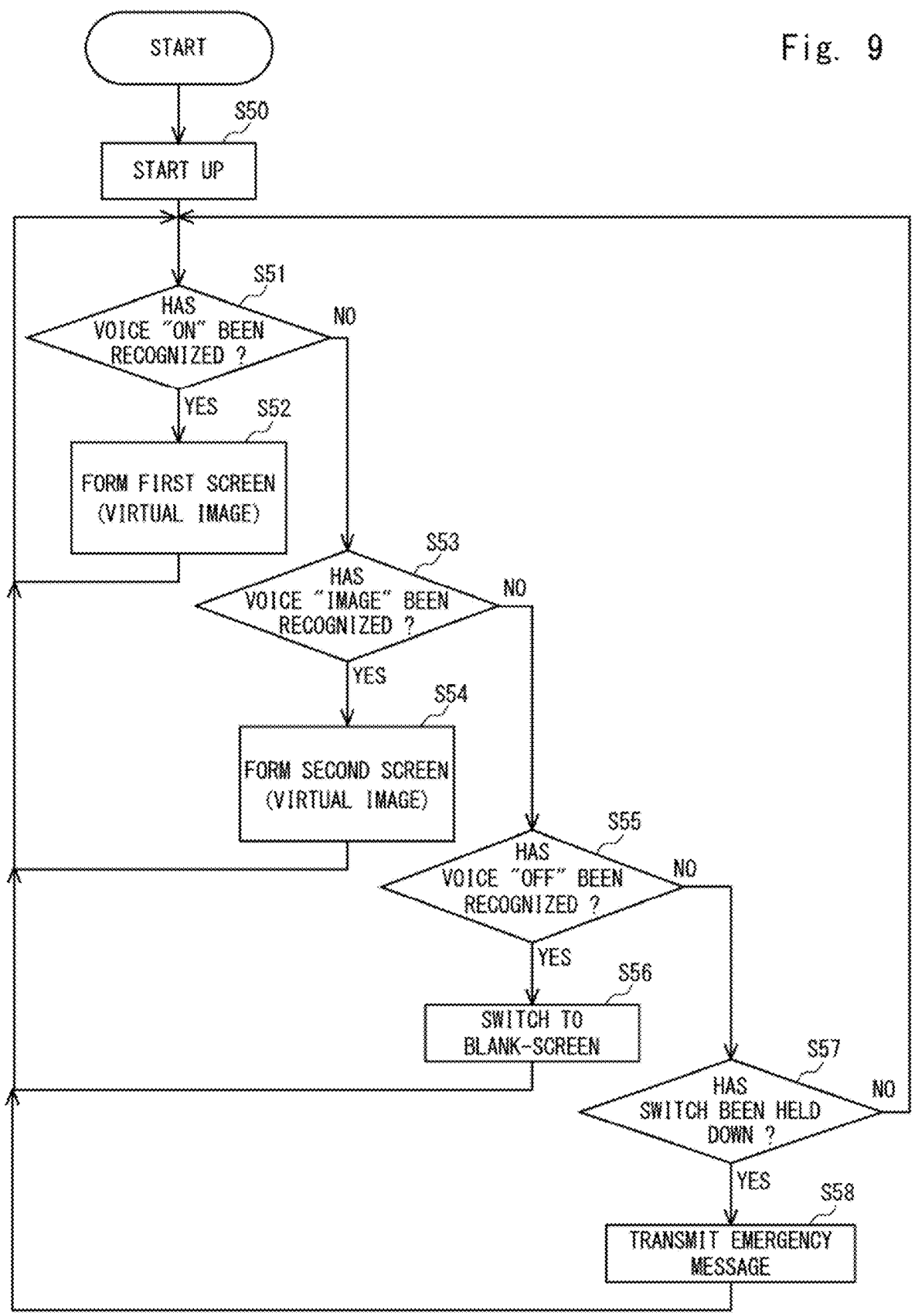
FIG. 9 is a flowchart of operations (a display switching process 2) performed by the information display system 1.

FIG. 9 is a flowchart of operations (the display switching process 2) performed by the information display system 1. The process shown in FIG. 9 is mainly implemented by having the control unit 11a (the processor) of the control BOX 11 execute a predetermined program loaded from a nonvolatile memory such as the ROM 11c into the RAM 11b. In the following description, it is assumed that various sensors detect (i.e., obtain) environmental information of the environment in which the member of the fire brigade works.

Firstly, the control BOX 11 is started up (Step S50). At this point, nothing is projected onto the combiner 10a1.

Next, the control unit 11a determines whether or not the voice recognition unit 11a2 has recognized a voice "ON" uttered by the member of the fire brigade (Step S51).

When it is determined that the voice recognition unit 11a2 has recognized the voice "ON" (Step S51: Yes), the display control unit 11a1 forms (i.e., shows) a first screen DP1 (a virtual image) in which an environmental information display area (including the air cylinder remaining amount (remaining pressure) display area a3, the entry elapsed time display area a4, and the detection target gas concentration display area a5) is arranged in a display arrangement shown in FIG. 4 (Step S52).

Alternatively, when it is determined that the voice recognition unit 11a2 has recognized a voice "image" (Step S51: No, Step S53: Yes), the display control unit 11a1 forms a second screen DP2 (a virtual image) in which an image display area a2 is also disposed, in addition to the environmental information display area (including the air cylinder remaining amount (remaining pressure) display area a3, the entry elapsed time display area a4, and the detection target gas concentration display area a5), in a display arrangement shown in FIG. 6 (Step S54).

Alternatively, when it is determined that the voice recognition unit 11a2 has recognized a voice "OFF" (Step S51: No, Step S53: No, Step S55: Yes), the display control unit 11a1 switches the screen to a blank-screen containing no information (i.e., no information is displayed in the screen) (Step S56).

Alternatively, when it is determined that the button of the switch 10d is held down (Step S51: No, Step S53: No, Step S55: No, Step S57: Yes), the control BOX 11 (communication unit 11d) transmits an emergency message to the captain terminal 20 or the like (Step S58). The emergency message is, for example, a message for reporting an abnormality of the member of the fire brigade.

After that, the processes in the steps S51 to S58 are repeatedly performed.

Note that the voice recognized in each of the steps S51, S53 and S55 is not limited to the above-described voice. That is, the voice recognized in each of the steps S51, S53 and S55 may be any voice as long as they are different from each other.

Next, as an example of operations performed by the information display system 1 having the above-described configuration, a message display process 1 will be described.

Figure 10:
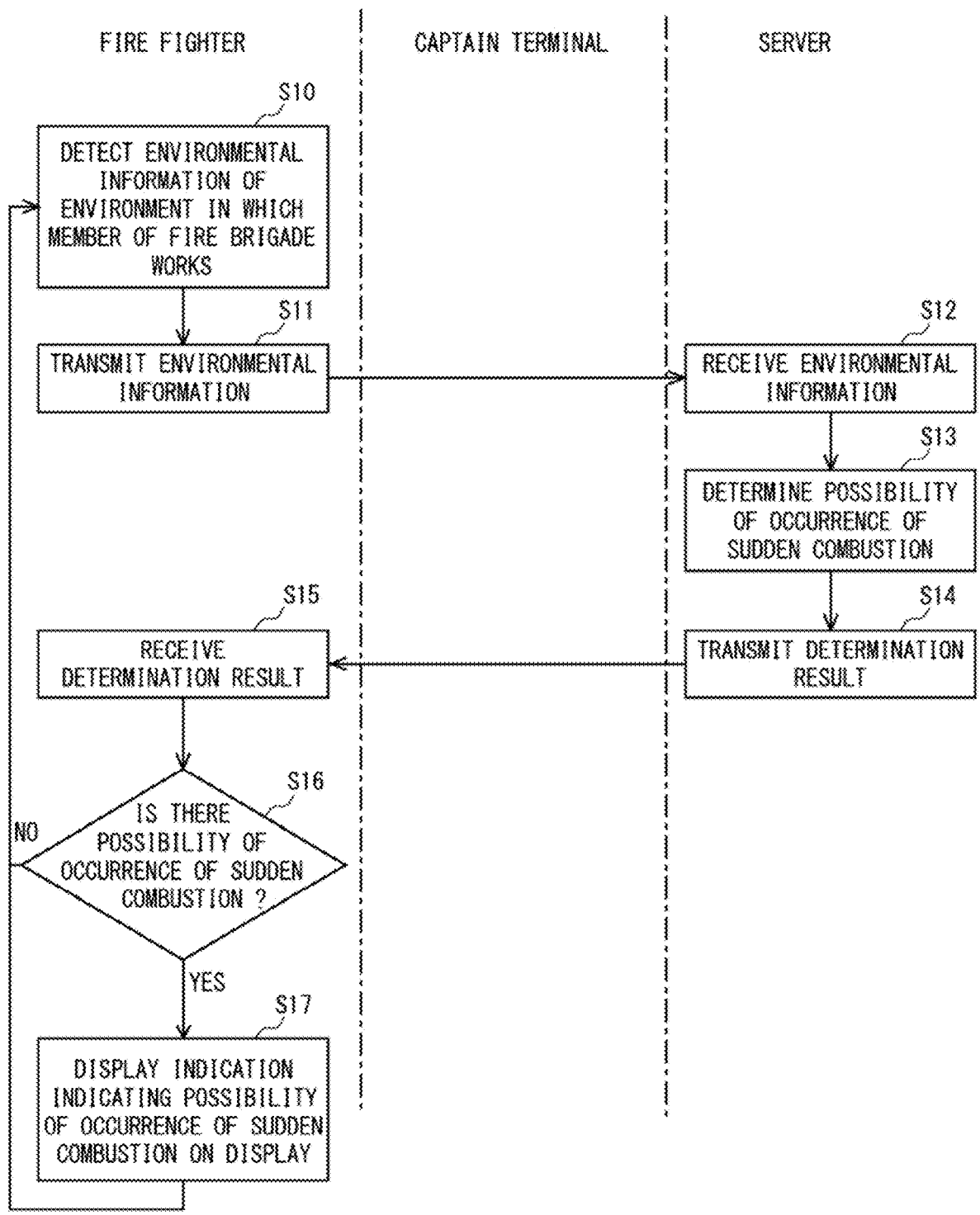
FIG. 10 is a sequence diagram of operations (a message display process 1) performed by the information display system 1.

FIG. 10 is a sequence diagram of operations (the message display process 1) performed by the information display system 1.

In the following description, it is assumed that the first screen DP1 (the virtual image) shown in FIG. 4 is formed (i.e., shown).

Firstly, various sensors detect environmental information of the environment in which the member of the fire brigade works (Step S10). For example, the infrared-light camera 10b photographs (or films) the environment in which the member of the fire brigade works. Further, the gas sensor 40 detects the concentration(s) of a gas(es) in the environment in which the member of the fire brigade works. Further, the temperature sensor 50 detects the temperature in the environment in which the member of the fire brigade works.

Next, the control BOX 11 (the communication unit 11d) transmits the environmental information (the results of the detection by the various sensors) detected in the step S10 to the server 30 through the communication line NW (Step S11).

Next, the server 30 (the communication unit 33) receives the environmental information transmitted from the control BOX 11 (Step S12).

Next, the server 30 (the determination unit 31a) determines (predicts) a possibility of an occurrence of sudden combustion in the environment in which the member of the fire brigade works based on the environmental information (the results of the detection by the various sensors) received from the control BOX 11 and the condition data 32a representing the conditions under which sudden combustion occurs, stored in the storage device 32 (Step S13).

For example, in the case where the environmental information (the results of the detection by the various sensors) received from the control BOX 11 is the result of the detection by the gas sensor 40 (and the result of the detection by the temperature sensor 50), the server 30 (the determination unit 31a) determines that there is a possibility of an occurrence of sudden combustion in the environment in which the member of the fire brigade works when the result of the detection by the gas sensor 40 (and the result of the detection by the temperature sensor 50) coincides with (or are similar to) the condition(s) under which sudden combustion occurs, i.e., the condition(s) represented by the condition data 32a stored in the storage device 32. In the other cases, the server 30 (the determination unit 31a) determines that there is no possibility of an occurrence of sudden combustion in the environment in which the member of the fire brigade works.

Meanwhile, in the case where the environmental information (the results of the detection by the various sensors) received from the control BOX 11 are images taken by the infrared-light camera 10b (or images taken by the visible-light camera 10c), the server 30 extracts data representing characteristics of flames shown in the images by performing image processing on the images. Then, when the extracted data representing the characteristics of the flames coincides with (or is similar to) the conditions under which sudden combustion occurs, i.e., the conditions represented by the condition data 32a stored in the storage device 32, the server 30 (the determination unit 31a) determines that there is a possibility of an occurrence of sudden combustion in the environment in which the member of the fire brigade works. In the other cases, the server 30 (the determination unit 31a) determines that there is no possibility of an occurrence of sudden combustion in the environment in which the member of the fire brigade works.

Next, the server 30 (the communication unit 33) transmits the result of the determination made in the step S13 to the control BOX 11 through the communication line NW (Step S14).

Next, the control BOX 11 (the communication unit 11d) receives the determination result transmitted from the server 30 (Step S15).

Then, when the determination result received from the server 30 indicates that there is a possibility of an occurrence of sudden combustion (Step S16: Yes), the control BOX 11 (the display control unit 11a1) displays (e.g., displays in a superimposed manner), in the first screen DP1, an urgent message M1, e.g., a message "Caution: Flashover has occurred" indicating that there is a possibility of an occurrence of sudden combustion in the environment in which the member of the fire brigade works as shown in FIG. 5 (Step S17). When doing so, the message M1 is preferably displayed (in a superimposed manner) at the center of the first screen DP1 in order to alert the member of the fire brigade.

Note that when the second screen DP2 (the virtual image) is formed (i.e., shown) instead of the above-described first screen DP1, the control BOX 11 (display control unit 11a1) displays (displays in a superimposed manner), in the second screen DP2, an urgent message M1, e.g., a message "Caution: Flashover has occurred" indicating that there is a possibility of an occurrence of sudden combustion in the environment in which the member of the fire brigade works as shown in FIG. 6. When doing so, the message M1 is preferably displayed (in a superimposed manner) at the center of the second screen DP2 in order to alert the member of the fire brigade.

As described above, by the message display process 1, it is possible, when there is a possibility of an occurrence of sudden combustion, to display the message M1 in a forced manner regardless of the operation (e.g., the button operation or the switching operation) performed by the member of the fire brigade. In this way, it is possible to directly and immediately alert the member of the fire brigade to the urgent message M1 (i.e., notify the member of the fire brigade of the urgent message M1.

Next, as an example of operations performed by the information display system 1 having the above-described configuration, a message display process 2 will be described.

Figure 11:
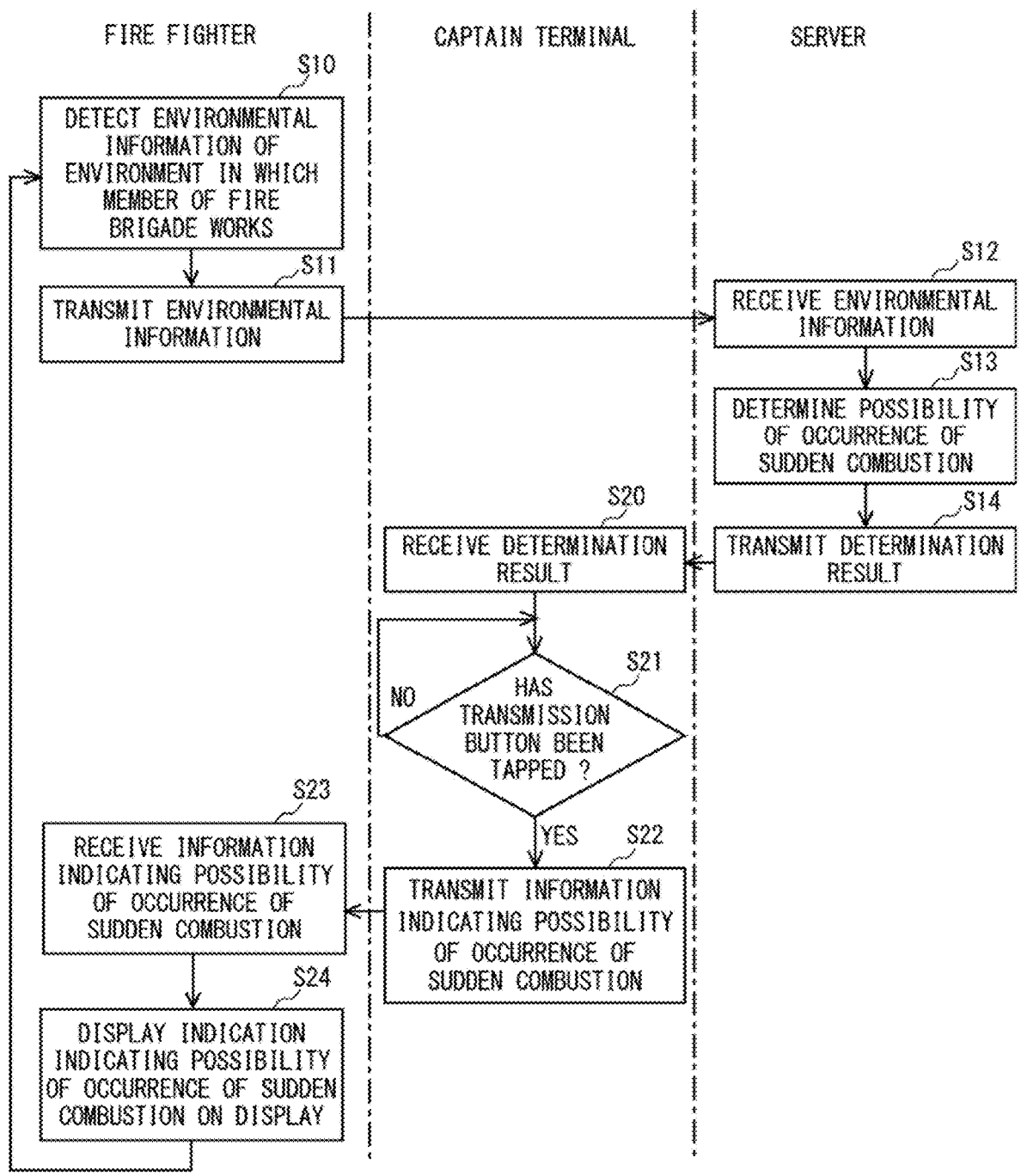
FIG. 11 is a sequence diagram of operations (a message display process 2) performed by the information display system 1.

FIG. 11 is a sequence diagram of operations (the message display process 2) performed by the information display system 1.

The flowchart shown in FIG. 11 is equivalent to one that is obtained by removing the steps S15 to S17 in the flowchart shown in FIG. 10 and adding processes in steps S20 to S24 therein. Differences from FIG. 10 will be mainly described hereinafter.

In the following description, it is assumed that the first screen DP1 (the virtual image) shown in FIG. 4 is formed (i.e., shown).

The captain terminal 20 (the communication unit 24) receives the determination result transmitted from the server 30 (Step 20). Next, the captain terminal 20 (the control unit 21) controls the display 23 so as to display the determination result, e.g., a message indicating that there is a possibility of an occurrence of sudden combustion in the environment in which the member of the fire brigade works (e.g., "Caution: Flashover has occurred") in the screen G2.

Then, when the leader of the fire brigade who has seen the above-described display, for example, taps a transmission button (not shown) displayed on the display 23 through the touch panel 22 (Step S21: Yes), the captain terminal 20 (the communication unit 24) transmits an urgent message M1, e.g., a message "Caution: Flashover has occurred" indicating that there is a possibility of an occurrence of sudden combustion in the environment in which the member of the fire brigade works to the control BOX 11 through the communication line NW (Step S22).

Next, the control BOX 11 (the communication unit 11d) receives the urgent message M1, e.g., the message "Caution: Flashover has occurred" indicating that there is a possibility of an occurrence of sudden combustion in the environment in which the member of the fire brigade works, transmitted from the captain terminal 20 (Step S23).

Then, as shown in FIG. 5, the control BOX 11 (the display control unit 11a1) displays (displays in a superimposed manner), in the first screen DP1, the urgent message M1, e.g., the message "Caution: Flashover has occurred" indicating that there is a possibility of an occurrence of sudden combustion in the environment in which the member of the fire brigade works, received in the step S23 (Step S24). When doing so, the message M1 is preferably displayed (in a superimposed manner) at the center of the first screen DP1 in order to alert the member of the fire brigade.

Note that when the second screen DP2 (the virtual image) is formed (i.e., shown) instead of the above-described first screen DP1, the control BOX 11 (the display control unit 11a1) displays (displays in a superimposed manner), in the second screen DP2, the urgent message M1, e.g., the message "Caution: Flashover has occurred" indicating that there is a possibility of an occurrence of sudden combustion in the environment in which the member of the fire brigade works, received in the step S23 as shown in FIG. 6. When doing so, the message M1 is preferably displayed (in a superimposed manner) at the center of the second screen DP2 in order to alert the member of the fire brigade.

As described above, by the message display process 2, it is possible, when there is a possibility of an occurrence of sudden combustion, to display the message M1 in a forced manner regardless of the operation (e.g., the button operation or the switching operation) performed by the member of the fire brigade. In this way, it is possible to directly and immediately alert the leader of the fire brigade and the member of the fire brigade to the urgent message M1 (i.e., notify them of the urgent message M1.

Next, as an example of operations performed by the information display system 1 having the above-described configuration, a message display process 3 will be described.

Figure 12:
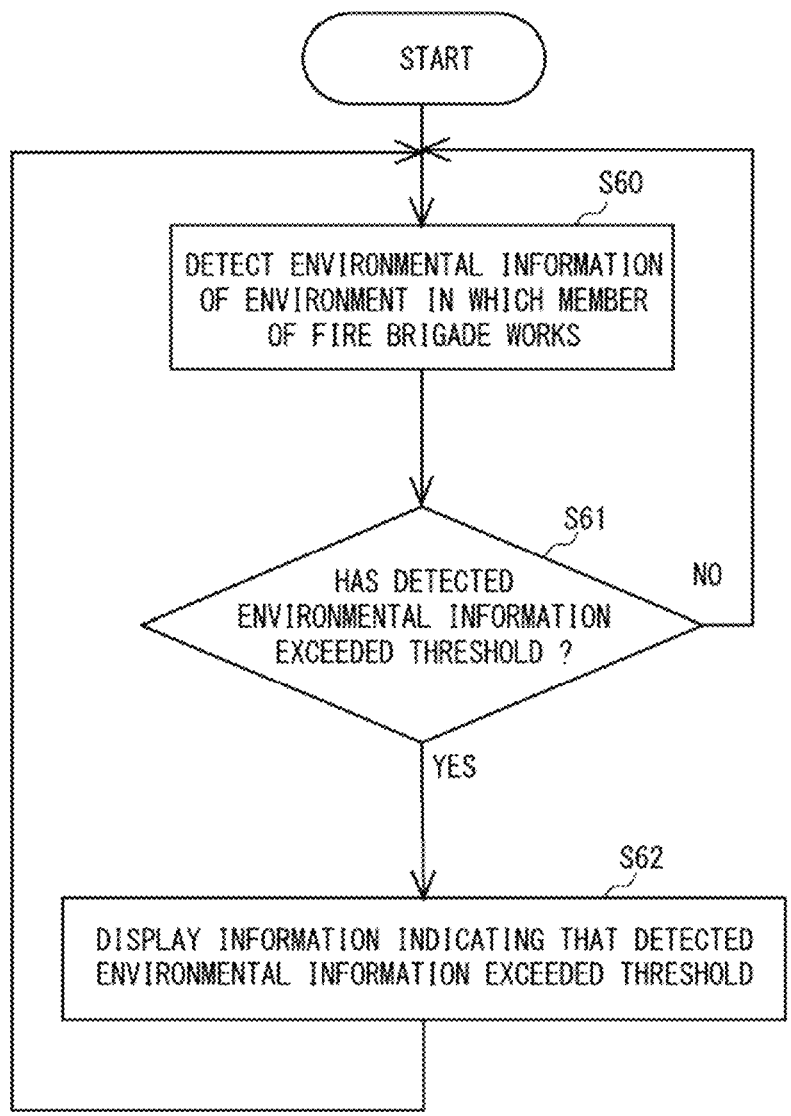
FIG. 12 is a flowchart of operations (a message display process 3) performed by the information display system 1.
Figure 13:
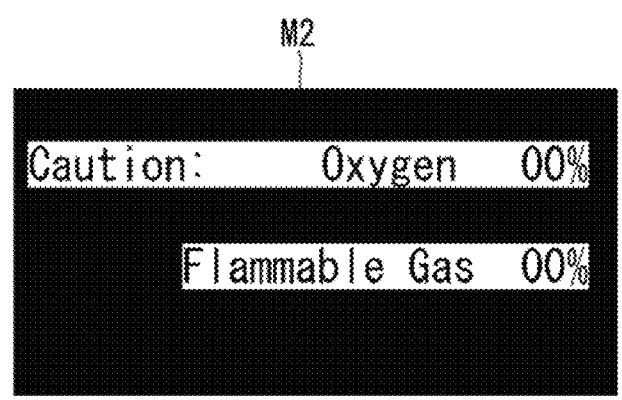
FIG. 13 is an example of a message M2 indicating that environmental information has exceeded a threshold.

FIG. 12 is a flowchart of operations (the message display process 3) performed by the information display system 1. FIG. 13 is an example of a message M2 indicating that environmental information has exceeded a threshold.

Firstly, various sensors detect environmental information of the environment in which the member of the fire brigade works (Step S60). For example, the gas sensor 40 detects the concentration(s) of a gas(es) in the environment in which the member of the fire brigade works. Further, the temperature sensor 50 detects the temperature in the environment in which the member of the fire brigade works.

Next, the control BOX 11 (the control unit 11a) determines whether or not the environmental information detected in the step S60 has exceeded a threshold (Step S61). As the threshold, for example, a threshold that is stored in advance in the ROM 11c or the like is used.

When it is determined that the environmental information detected in the step S60 has exceeded the threshold (Step S61: Yes), the control BOX 11 (the display control unit 11a1) displays (e.g., displays in a superimposed manner) a message M2 indicating that the environmental information has exceeded the threshold (see, for example, FIG. 13) in the first screen DP1 (or in the second screen DP2) (Step S62).

As described above, by the message display process 3, it is possible, when the environmental information has exceeded the threshold, to display the message M2 in a forced manner regardless of the operation (e.g., the button operation or the switching operation) performed by the member of the fire brigade. In this way, it is possible to directly and immediately alert the member of the fire brigade to the urgent message M2 (i.e., notify the member of the fire brigade of the urgent message M2).

As described above, according to the second example embodiment, it is possible to display a screen (e.g., the first screen DP1 or the second screen DP2) viewed by the member of the fire brigade wearing the mask 9 at an appropriate timing (e.g., at a timing at which the fire fighter enters the fire site). This is because the information display system 1 is equipped with the display control unit 11a1 that switches the displaying mode of the screen.

By giving the member of the fire brigade the right to select the displayed information as described above, the screen (e.g., the first screen DP1 or the second screen DP2) viewed by the member of the fire brigade wearing the mask 9, which would otherwise be displayed at all times, is not displayed at all times, so that the nuisance that the member of the fire brigade working at the site feels is alleviated.

Further, according to the second example embodiment, since the urgent message M1 or M2 is displayed (e.g., displayed in a superimposed manner) at the center of the screen (e.g., the first screen DP1 or the second screen DP2), it is possible to directly and immediately alert the member of the fire brigade to the urgent message M1 or M2.

Next, modified examples will be described.

Further, although an example in which the gas sensor 40 and the temperature sensor 50 are used has been described in the above-described second example embodiment, the configuration according to the present invention is not limited to this example. For example, at least one of the gas sensor 40 and the temperature sensor 50 may not be provided, and/or other types of sensors may be added.

Further, although an example in which an oxygen sensor, a carbon monoxide sensor, a hydrogen sulfide sensor, a sulfur dioxide sensor, and a flammable gas sensor are used as the gas sensors 40 has been described in the above-described second example embodiment, the configuration according to the present invention is not limited to this example. For example, at least one of the oxygen sensor, the carbon monoxide sensor, the hydrogen sulfide sensor, the sulfur dioxide sensor, and the flammable gas sensor may not be provided, and/or other types of sensors may be added.

Further, although an example in which the specific incident is sudden combustion (e.g., a flashover or a backdraft) that may occur in an environment in which members of a fire brigade work has been described in the above-described second example embodiment, the specific incident is not limited to this example. For example, the specific incident may be detection of sarin, anthrax, radiation, or the like. That is, the specific incident is an event for which it is generally considered, from the viewpoint of protecting human lives, desirable to call attention before it actually occurs, and it may be an event caused by a natural phenomenon (e.g., a flashover or a backdraft) or may be an artificially-caused event (e.g., spraying of sarin).

For example, the specific incident may be "an occurrence of a heat stroke." In this case, it is possible to call attention, for example, as follows.

For example, a possibility of an occurrence of a heat stroke is determined by comparing biological information collected from a sensor(s) for detecting biological information (e.g., a blood pressure, an amount of sweating, and/or a body temperature) of a member of a fire brigade, attached to the member of the fire brigade with condition data representing conditions under which a heat stroke occurs (e.g., a past case where a heat stroke occurs). Then, when it is determined that there is a possibility that a heat stroke may occur, the member of the fire brigade or the like is alerted to the fact that there is a possibility of an occurrence of a heat stroke as in the second example embodiment.

As described above, various events can be adopted as the specific incident. According to the first and second example embodiments, and the modified examples thereof, it is possible to call attention to the fact that there is a possibility of an occurrence of a specific incident before the specific incident actually occurs, and thereby to protect more human lives.

Further, although an example in which the person wearing the smart mask 10 (and a breathing apparatus) is a member of a fire brigade has been described in the above-described second example embodiment, the person wearing the smart mask 10 is not limited to this example. For example, the person wearing the smart mask 10 (and the breathing apparatus) may be, for example, a person working in an air-contaminated and hazardous environment such as a police officer, a member of the Self-Defense Forces, and a worker in a nuclear facility. According to the present invention, it is also possible to provide useful information to a person working in such a severe environment at an appropriate timing.

Further, although examples in which the switch 10d or the voice recognition unit 11a2 is used as the switching means 60 have been described in the above-described second example embodiment, the switching means 60 is not limited to these examples. For example, a motion gesture detection unit that detects a motion gesture (e.g., waving a hand in front the eyes, nodding, or shaking the head) performed by a member of a fire brigade may be provided as the switching means 60. Then, when a specific motion gesture is detected by the motion gesture detection unit, the displaying mode of the screen may be switched.

Further, although an example in which the screen viewed by the member of the fire brigade wearing the mask 9 is a virtual image that is displayed, by the combiner 10a1, as if it is floating in front of the member of the fire brigade has been described in the above-described second example embodiment, the screen is not limited to this example. For example, although it is not shown, the screen (i.e., the window or the image) viewed by (i.e., displayed for) the member of the fire brigade wearing the mask 9 may be a screen visible as a real image. For example, the screen may be a screen displayed on a small display device (e.g., an organic EL display device). The small display device is attached, for example, to the mask 9. The small display device is disposed in front of the face of the member of the fire brigade (between the face and the transparent cover 10a) in the state in which the mask 9 is worn by the member of the fire brigade. Even in this configuration, the member of the fire brigade can view various screens (real images) displayed on the small display device without substantially moving his/her line of sight.

Further, although an example in which the infrared-light camera 10b and the visible-light camera 10c (examples of the image-pickup apparatus according to the present invention) are attached to the smart mask 10 (the mask 9) worn by the member of the fire brigade has been described in the above-described second example embodiment, the configuration according to the present invention is not limited to this example. For example, the infrared-light camera 10b and the visible-light camera 10c may be attached to any place on the outfit worn by the member of the fire brigade. For example, they may be attached to a fire suit worn by the member of the fire brigade.

In the above-described first and second example embodiments, the program may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), CD-R, CD-R/W, and a semiconductor memory (such as a mask ROM, a PROM (Programmable ROM), an EPROM (Erasable PROM), a flash ROM, and a RAM (Random Access Memory)). Further, the programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

All the numeral values mentioned in the above-described example embodiments are merely examples, and needless to say, numeral values different from them can be uses as desired.

The above-described example embodiments are merely examples in all the aspects thereof. The present invention should not be limited by the descriptions of the above-described example embodiments. The present invention may be carried out in various other forms without departing from the spirit or main features of the invention.

Further, the whole or part of the example embodiments disclosed above can be described as, but not limited to, the following supplementary notes.

(Supplementary Note 1)

An information display system comprising:

display means attached to a mask, the display means being configured to display a screen viewed by a person wearing the mask; and display control means for switching a displaying mode of the screen.

(Supplementary Note 2)

The information display system described in Supplementary note 1, wherein the display control means switches the screen to one of a first screen including an environmental information display area, a second screen including an image display area in addition to the environmental information display area, and a blank-screen including no information.

(Supplementary Note 3) The information display system described in Supplementary note 2, wherein environmental information detected by at least one sensor attached to an outfit worn by the person wearing the mask is displayed in the environmental information display area.

(Supplementary Note 4)

The information display system described in Supplementary note 2 or 3, wherein an image taken by an image-pickup apparatus attached to an outfit worn by the person wearing the mask is displayed in the image display area.

(Supplementary Note 5)

The information display system described in any one of Supplementary notes 2 to 4, wherein a message indicating that there is a possibility of an occurrence of a specific incident is displayed in the first screen or the second screen at a predetermined timing.

(Supplementary Note 6)

The information display system described in any one of Supplementary notes 2 to 5, wherein when the environmental information detected by the at least one sensor has exceeded a threshold, a message indicating that the environmental information has exceeded the threshold is displayed in the first screen or the second screen.

(Supplementary Note 7)

The information display system described in Supplementary note 5 or 6, wherein the message is displayed at a center of the screen.

(Supplementary Note 8)

The information display system described in any one of Supplementary notes 1 to 7, further comprising a switch operated by the person wearing the mask, wherein the display control means switches the displaying mode of the screen when the person wearing the mask performs a specific operation for the switch.

(Supplementary Note 9)

The information display system described in any one of Supplementary notes 1 to 8, further comprising voice recognition means for recognizing a voice uttered by the person wearing the mask, wherein the display control means switches the displaying mode of the screen when a specific voice is recognized by the voice recognition means.

(Supplementary Note 10)

The information display system described in any one of Supplementary notes 1 to 8, further comprising motion gesture detection means for detecting a motion gesture performed by the person wearing the mask, wherein the display control means switches the displaying mode of the screen when a specific motion gesture is detected by the motion gesture detection means.

(Supplementary Note 11)

The information display system described in any one of Supplementary notes 1 to 10, wherein the screen is a screen that is displayed as a virtual image as if it is floating in front of the person wearing the mask.

(Supplementary Note 12)

The information display system described in Supplementary note 11, wherein the display means is a transparent cover, the transparent cover being attached to the mask, disposed in front of a face of the person wearing the mask in a state in which the mask is attached to the person wearing the mask, and including an area onto which a screen displayed as a virtual image as if it is floating in front of the person wearing the mask is projected.

(Supplementary Note 13)

The information display system described in any one of Supplementary notes 1 to 10, wherein the screen is a screen displayed as a real image by the person wearing the mask.

(Supplementary Note 14)

The information display system described in Supplementary note 13, wherein the display means is a display attached to the mask, the display being configured to display the screen.

(Supplementary Note 15)

An information display method comprising:

a step of displaying a screen viewed by a person wearing a mask; and a step of switching a displaying mode of the screen.

(Supplementary Note 16)

The information display method described in Supplementary note 15, wherein the step of switching the displaying mode of the screen is to switch the screen to one of a first screen including an environmental information display area, a second screen including an image display area in addition to the environmental information display area, and a blank-screen including no information.

REFERENCE SIGNS LIST

1 INFORMATION DISPLAY SYSTEM
9 MASK
10 SMART MASK
10a TRANSPARENT COVER
10a1 COMBINER
10b INFRARED-LIGHT CAMERA
10c VISIBLE-LIGHT CAMERA
10d SWITCH
10e MICROPHONE
11 CONTROL BOX
11a CONTROL UNIT
11a1 DISPLAY CONTROL UNIT
11a2 VOICE RECOGNITION UNIT
11b RAM
11c ROM
11d COMMUNICATION UNIT
20 CAPTAIN TERMINAL
21 CONTROL UNIT
22 TOUCH PANEL
23 DISPLAY
24 COMMUNICATION UNIT
30 SERVER
31 CONTROL UNIT
31a DETERMINATION UNIT
31b LEARNING UNIT
32 STORAGE DEVICE
32a CONDITION DATA
33 COMMUNICATION UNIT
40 GAS SENSOR
50 TEMPERATURE SENSOR
60 DISPLAY CONTROL MEANS
DP1 FIRST SCREEN
DP2 SECOND SCREEN
a2 CAMERA IMAGE DISPLAY AREA
a3 AIR CYLINDER REMAINING AMOUNT (REMAINING PRESSURE) DISPLAY AREA
a4 ENTRY ELAPSED TIME DISPLAY AREA
a5 DETECTION TARGET GAS CONCENTRATION DISPLAY AREA
NW COMMUNICATION LINE

What is claimed is:

1. An information display system comprising:
a display device attached to a mask, the display device being configured to display a screen viewed by a person wearing the mask;
a display controller configured to switch a displaying mode of the screen;
a sensor configured to detect environmental information of the environment in which the person wearing the mask works; and
a determiner configured to determine a possibility of an occurrence of a specific incident in the environment in which the person wearing the mask works based on the environmental information and condition data representing conditions under which the specific incident occurs, wherein
the display controller is further configured to switch the screen to one of a first screen including an environmental information display area, a second screen including an image display area in addition to the environmental information display area, and a blank-screen including no information,
a message indicating that there is a possibility of an occurrence of the specific incident is displayed in the first screen or the second screen, when a determination result of the determiner is a possibility of an occurrence of specific incident.

2. The information display system according to claim 1, wherein environmental information detected by at least one sensor attached to an outfit worn by the person wearing the mask is displayed in the environmental information display area.

3. The information display system according to claim 1, wherein an image taken by an image-pickup apparatus attached to an outfit worn by the person wearing the mask is displayed in the image display area.

4. The information display system according to claim 1, wherein when the environmental information detected by at least one sensor has exceeded a threshold, a message indicating that the environmental information has exceeded the threshold is displayed in the first screen or the second screen.

5. The information display system according to claim 1, wherein the message is displayed at a center of the screen.

6. The information display system according to claim 1, further comprising a switch operated by the person wearing the mask, wherein
the display controller is further configured to switch the displaying mode of the screen when the person wearing the mask performs a specific operation for the switch.

7. The information display system according to claim 1, further comprising a voice recognizer configured to recognize a voice uttered by the person wearing the mask, wherein
the display controller is further configured to switch the displaying mode of the screen when a specific voice is recognized by the voice recognizer.

8. The information display system according to claim 1, further comprising a motion gesture detector configured to detect a motion gesture performed by the person wearing the mask, wherein
the display controller is further configured to switch the displaying mode of the screen when a specific motion gesture is detected by the motion gesture detector.

9. The information display system according to claim 1, wherein the screen is a screen that is displayed as a virtual image as if it is floating in front of the person wearing the mask.

10. The information display system according to claim 9, wherein the display device is a transparent cover, the transparent cover being attached to the mask, disposed in front of a face of the person wearing the mask in a state in which the mask is attached to the person wearing the mask, and including an area onto which a screen displayed as a virtual image as if it is floating in front of the person wearing the mask is projected.

11. The information display system according to claim 1, wherein the screen is a screen displayed as a real image by the person wearing the mask.

12. The information display system according to claim 11, wherein the display device is a display attached to the mask, the display being configured to display the screen.

13. An information display method comprising:
displaying a screen viewed by a person wearing a mask;
switching the screen to one of a first screen including an environmental information display area, a second screen including an image display area in addition to the environmental information display area, and a blank-screen including no information;
determining a possibility of an occurrence of a specific incident in the environment in which the person wearing the mask works based on environmental information of the environment in which the person wearing the mask works and condition data representing conditions under which the specific incident occurs; and
displaying a message indicating that there is a possibility of an occurrence of the specific incident is displayed in the first screen or the second screen, when a determination result of the determining is a possibility of an occurrence of specific incident.

* * * * *